US012320167B2

(12) United States Patent
Xu

(10) Patent No.: US 12,320,167 B2
(45) Date of Patent: Jun. 3, 2025

(54) MOTOR VEHICLE LOCK

(71) Applicant: Kiekert AG, Heiligenhaus (DE)

(72) Inventor: Ping Xu, Hong Kong (CN)

(73) Assignee: Kiekert AG, Heiligenhaus (DE)

( * ) Notice: Subject to any disclaimer, the term of this patent is extended or adjusted under 35 U.S.C. 154(b) by 201 days.

(21) Appl. No.: 17/907,580

(22) PCT Filed: Mar. 12, 2021

(86) PCT No.: PCT/IB2021/052082
§ 371 (c)(1),
(2) Date: Oct. 10, 2022

(87) PCT Pub. No.: WO2021/205251
PCT Pub. Date: Oct. 14, 2021

(65) Prior Publication Data

US 2023/0128928 A1 Apr. 27, 2023

(30) Foreign Application Priority Data

Apr. 8, 2020 (CN) ......................... 202010271844.5

(51) Int. Cl.
*E05B 81/16* (2014.01)
*E05B 77/28* (2014.01)
(Continued)

(52) U.S. Cl.
CPC .............. *E05B 81/16* (2013.01); *E05B 77/28* (2013.01); *E05B 81/06* (2013.01); *E05B 81/30* (2013.01);
(Continued)

(58) Field of Classification Search
CPC .......... E05B 81/00; E05B 81/16; E05B 81/06; E05B 81/30; E05B 81/34; E05B 77/28;
(Continued)

(56) References Cited

U.S. PATENT DOCUMENTS 4,269,440 A * 5/1981 Gelhard .................. E05B 81/54 292/201
5,584,515 A * 12/1996 Silye ....................... E05B 81/36 292/201
(Continued)

FOREIGN PATENT DOCUMENTS

DE 10258646 B3 * 5/2004 ............. E05B 77/26
DE 102014000680 A1 7/2015
(Continued)

OTHER PUBLICATIONS

International Search Report mailed Jul. 9, 2021, for priority International Patent Application No. PCT/IB2021/052082.

*Primary Examiner* — Suzanne L Barrett
(74) *Attorney, Agent, or Firm* — Renner, Otto, Boisselle & Sklar, LLP

(57) ABSTRACT

A motor vehicle lock comprising a locking mechanism which essentially consists of a rotary latch and a pawl, further comprising a drive and a securing element. The drive acts on the securing element via a toothed rack element that is equipped with a blocking element. According to the invention, the blocking element is in the form of a tilting lever defining at least two end positions of the toothed rack element.

17 Claims, 4 Drawing Sheets

(51) Int. Cl.

| | |
|---|---|
| ***E05B 81/06*** | (2014.01) |
| ***E05B 81/30*** | (2014.01) |
| ***E05B 81/34*** | (2014.01) |
| ***E05B 83/36*** | (2014.01) |
| ***E05B 85/26*** | (2014.01) |

(52) U.S. Cl.
CPC .............. *E05B 81/34* (2013.01); *E05B 83/36* (2013.01); *E05B 85/26* (2013.01)

(58) Field of Classification Search
CPC ...... E05B 83/36; E05B 85/26; Y10T 70/7102; Y10T 70/7107
USPC .......................................................... 70/278.7
See application file for complete search history.

(56) References Cited

U.S. PATENT DOCUMENTS

| | | | | |
|---|---|---|---|---|
| 6,526,790 | B2 * | 3/2003 | Wegner | E05B 81/42 292/216 |
| 6,655,179 | B2 * | 12/2003 | Kobayashi | E05B 77/28 70/279.1 |
| 11,613,917 | B2 * | 3/2023 | Im | E05B 81/34 70/278.7 |
| 2002/0050156 | A1 * | 5/2002 | Kobayashi | E05B 77/28 70/237 |
| 2011/0259061 | A1 | 10/2011 | Brose et al. | |
| 2013/0015670 | A1 * | 1/2013 | Perkins | E05B 77/12 29/428 |
| 2022/0034144 | A1 * | 2/2022 | Reddmann | E05F 15/619 |
| 2022/0034145 | A1 * | 2/2022 | Reddmann | E05F 15/619 |
| 2023/0074045 | A1 * | 3/2023 | Fuchs | E05B 81/30 |
| 2023/0112684 | A1 * | 4/2023 | Cetnar | E05B 81/06 70/278.7 |
| 2023/0167660 | A1 * | 6/2023 | Tomaszewski | E05B 77/26 70/278.7 |
| 2023/0220705 | A1 * | 7/2023 | Farnesi | E05B 77/26 70/278.7 |

FOREIGN PATENT DOCUMENTS

| | | | | | |
|---|---|---|---|---|---|
| DE | 102016108417 | A1 | | 11/2017 | |
| DE | 102022113485 | A1 | * | 12/2022 | B60J 5/0468 |
| DE | 102022128469 | A1 | * | 5/2023 | E05B 77/26 |
| EP | 834631 | A1 | * | 4/1998 | E05B 81/16 |
| EP | 1473428 | A1 | * | 11/2004 | E05B 77/26 |
| EP | 1030012 | B1 | * | 1/2011 | E05B 83/36 |
| GB | 2119008 | A | * | 11/1983 | E05B 77/28 |
| JP | 2002081237 | A | | 3/2002 | |
| JP | 2007211506 | A | | 8/2007 | |
| KR | 970043855 | U | | 7/1997 | |
| WO | WO-9827301 | A2 | * | 6/1998 | E05B 77/26 |
| WO | WO-2013127381 | A2 | * | 9/2013 | E05B 47/0012 |
| WO | WO-2019076399 | A1 | * | 4/2019 | E05B 77/02 |

* cited by examiner

MOTOR VEHICLE LOCK

This application is a national phase of International Patent Application No. PCT/IB2021/052082 filed Mar. 12, 2021, which claims priority to Chinese Patent Application No. 202010271844.5 filed Apr. 8, 2020, each of which is hereby incorporated herein by reference in its entirety.

FIELD OF DISCLOSURE

The invention relates to a motor vehicle lock comprising a locking mechanism which essentially consists of a rotary latch and a pawl, further comprising a drive and a securing element, wherein the drive acts on the securing element via a toothed rack element that is equipped with a blocking element.

BACKGROUND OF DISCLOSURE

Motor vehicle locks typically have a central locking system and, if necessary, an anti-theft device. With the help of the central locking system, all doors equipped with an associated motor vehicle lock can be locked together. As a result, access from the outside is generally not possible, but the motor vehicle doors in question can nevertheless be opened from the inside of the motor vehicle. If an anti-theft device is additionally implemented, opening from the inside is also suppressed in the "theft-proof" state, so that the motor vehicle in question cannot be opened even if the window of the associated motor vehicle door is smashed.

Appropriate mechanisms are provided for locking such a motor vehicle lock and also for inserting an anti-theft device, which mostly work in a rotary or linear manner. In this way, the associated motor vehicle lock is transferred to its locked or unlocked state or its theft-proof or non-theft-proof state.

In addition, however, a child safety function can in principle also be implemented, specifically generally on rear motor vehicle side doors. In the "child-proof" position, the motor vehicle lock in question cannot be opened from the inside, but it can be opened from the outside. As in the case of the anti-theft device, the child safety device can basically be inserted with the help of a drive. In addition, mechanical solutions for operating the child safety device are known.

The term "securing element" is to be interpreted broadly within the scope of the present application. In fact, this can be a locking element as well as an anti-theft element. This also includes a child safety element. As a result, it should generally be possible to set completely different functional positions of the motor vehicle lock with the help of the securing element.

If an accident occurs in a motor vehicle equipped with such a motor vehicle lock, the adjustment from a locked position to an unlocked position or, in the case of an anti-theft device, the adjustment from a secured position to an unlocked position should generally be avoided in order to prevent accidental door openings. For this purpose, the generic state of the art according to DE 10 2014 000 680 A1 works with a so-called position securing device.

The position securing device is provided for a slidably mounted carriage and serves to secure the position of the slidably mounted carriage. For this purpose, the position securing device in the known teaching comprises a tilting device with the aid of which the carriage can be tilted in the event of an excessively high acceleration. As a result, a reliable mode of operation is implemented and made available overall, taking into account a small-sized position securing device.

Instead of such a position securing device, it is also possible in principle to proceed in such a way that a drive for the respective securing element is transferred back into its basic position after the securing element has been acted upon. Such a procedure decouples the drive from the securing element, so to speak, so that, for example, impacts on the drive caused by a crash do not act on the securing element.

In addition, in the state of the art, efforts are made in principle to reduce the design effort. For this purpose, the generic state of the art according to DE 10 2014 000 680 A1 already works with a motor or a drive in order to change both the position of a lock and an anti-theft device as required.

The position that has been set is then secured with the help of the additional position securing device provided. This is relatively expensive, because the position securing device requires a special spring designed as a double-acting pincer spring for its realization. The invention as a whole seeks to remedy this.

SUMMARY OF DISCLOSURE

The invention is based on the technical problem of further developing such a motor vehicle lock in such a way that different securing positions can be reproducibly and safely and reliably adopted while taking into account a structurally simple structure.

To solve this technical problem, a generic motor vehicle lock is characterized within the scope of the invention in that the blocking element is designed as a tilting lever defining at least two end positions of the toothed rack element.

Due to the special blocking element designed as a tilting lever, at least two end positions of the toothed rack element can be defined and implemented according to the invention. These two end positions can belong, for example, to the functional positions "child-proof" and "theft-proof." As a result, there is the possibility within the scope of the invention not only of being able to clearly distinguish between these two functional positions. Instead, only one (single) drive for the toothed rack element is required for this, which in turn works on the securing element. This allows the design effort to be reduced because the anti-theft function and the child safety function do not require their own drive.

Rather, according to the invention, the one (single) drive is used in order to be able to map both the child safety function and the anti-theft function via the toothed rack element. This is possible because the respective end positions "child-proof" or "theft-proof" belong to different end positions of the toothed rack element, which in turn are approached with the help of the blocking element designed as a tilting lever in a targeted and precisely positioned manner. In contrast, the functional positions "non-child-proof" and "non-anti-theft" correspond to a common initial position of the toothed rack element before it is actuated. In this way, the overall design effort is reduced and the functional reliability is increased because the blocking element or the tilting lever directly defines the two end positions of the toothed rack element.

In order to realize and implement this in detail, the tilting lever is usually connected to the toothed rack element. In principle, this can be done in such a way that the tilting lever is connected in an articulated manner to the toothed rack element by means of a transmission lever. The tilting lever and the transmission lever are generally mounted coaxially relative to one another. In addition, in this context, the tilting lever is usually also equipped with a restoring spring.

This restoring spring is advantageously a bistable spring, i.e., a spring that allows acting in one direction and also in its opposite direction and ensures a corresponding restoring movement into a middle position or middle 0 position after the force acting on it has ceased. In principle and advantageously, however, it is also possible to work with a simple torsion spring. That ultimately depends on how the position of the individual functional positions is implemented and realized with the help of the toothed rack element.

The tilting lever is usually equipped with two blocking legs in a C-shaped manner. The design is also such that the respective blocking leg of the C-shaped tilting lever interacts with a stop arranged between the blocking legs. In other words, the C-shape of the tilting lever makes it possible for the invention to position the relevant stop or multiple stops between the two ends of the blocking legs.

In this context, it has proven to be particularly advantageous if the stop is designed as a component part of the drive. As a result, stops that have to be additionally formed can basically be avoided, which further reduces the design complexity. The stop is usually formed on a worm wheel of the drive. In this case, the invention is based on the knowledge that the drive for the toothed rack element is usually equipped with an electric motor and a drive worm on the output shaft of the electric motor. This drive worm meshes with the previously mentioned worm wheel of the drive.

In most cases, the design is then made in such a way that the worm wheel carries a gear wheel which meshes with the toothed rack element. In this way, different gear ratios can be implemented as required, as will be explained in more detail below with reference to the description of the drawings.

In any case, according to the invention, the stop is formed on the worm wheel. For this purpose, the worm wheel usually has a rear stop disk which is usually designed in one piece with the worm wheel (made of plastics material). The stop disk thereby defines on its outer circumference two opposing stops for the corresponding blocking leg of the tilting lever that surrounds the stop disk in a C-shaped manner. In this way, the two end positions of the toothed rack element in question can be implemented in a particularly simple and functionally reliable manner.

The securing element is generally connected in an articulated manner to the toothed rack element. In addition, the securing element is usually a securing lever acted upon by a spring. Through its interaction with the securing lever, the spring ensures that the securing lever is secured in position.

For this purpose, the securing lever is usually designed with a spring cantilever which interacts with a leg of the spring designed as a torsion spring. This leg or spring leg of the spring usually has a lug which interacts and can interact with the spring cantilever in such a way that the securing element or securing lever is secured at least in the three positions “unlocked,” “theft-proof,” and finally “child-proof” described above. For this purpose, the spring cantilever is equipped with a bulge adapted to the contour of the lug, as will be explained in more detail with reference to the description of the drawings.

As a result, a motor vehicle lock, and in particular a motor vehicle door lock, is made available which is structurally particularly simple by using a (single) drive for both the child safety function and the anti-theft function. The fact that the securing element that can be moved into the three different functional positions in a controlled manner is and can be adjusted with the help of a toothed rack element also contributes thereto.

For this purpose, the toothed rack element has a blocking element designed as a tilting lever, with the aid of which at least two end positions of the toothed rack element can be defined. An additionally realized initial position of the toothed rack element is approached by the spring assigned to the tilting lever after the force has been applied by the drive. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
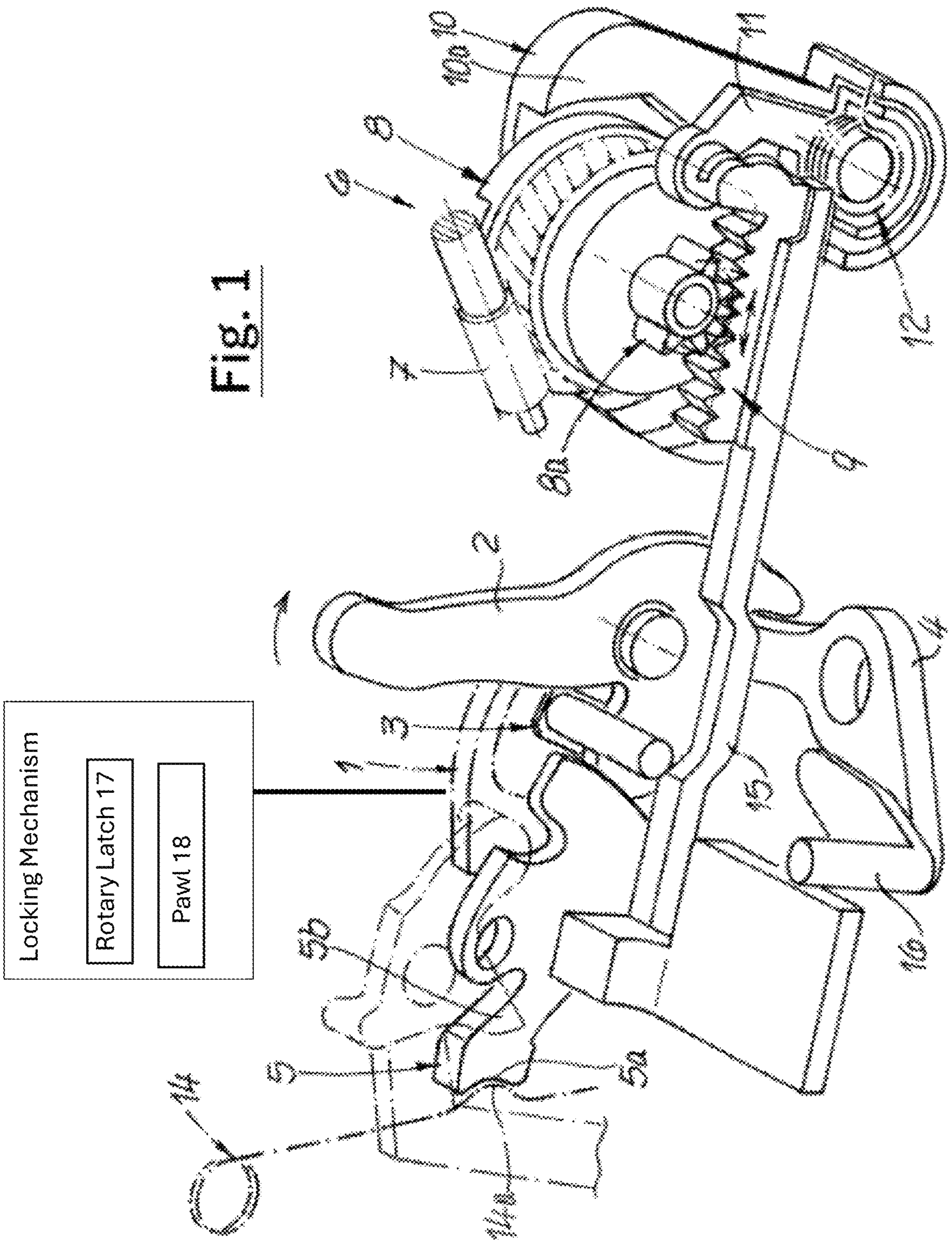
FIG. 1 shows the motor vehicle lock according to the invention in its neutral functional position.

In the drawings, a motor vehicle lock is shown, which is a motor vehicle door lock. This has a locking mechanism consisting essentially of a rotary latch 17 and a pawl 18 shown in block diagram form. To release and operate the locking mechanism, an operating lever 1 is implemented, which is mounted on the same axis as an opening lever 2. The locking mechanism can be opened mechanically with the help of the opening lever 2, regardless of the position of the operating lever 1 and a clutch lever 3.

If the clutch lever 3 is in its engaged position (cf. FIG. 2B), an actuation of the actuating lever or external actuating lever 1 about its axis in the clockwise direction indicated in FIG. 1 results in the actuating lever 1 being able to open the locking mechanism via the opening lever 2 and a release lever 4, in that the release lever 4 lifts the pawl which has fallen into the rotary latch out of its engagement with the rotary latch. If, on the other hand, the clutch lever or outer clutch lever 3 is in its “disengaged” position shown in FIG. 1 (and in FIGS. 2A and 2C), a corresponding opening movement of the actuating lever or outer actuating lever 1 is ineffective in the example. However, opening via the motor-driven opening lever 2 is still possible. For this purpose, the opening lever 2 is acted upon in a clockwise direction about its axis which is common to the actuating lever 1.

The clutch lever or outer clutch lever 3 is transferred to the “disengaged” position shown in FIG. 1 (and in FIGS. 2A and 2C) with the help of a securing element 5, as will be explained in more detail below. For this purpose, a drive 6, 7, 8 for a toothed rack element 9 is additionally provided. The drive 6, 7, 8 works via the toothed rack element 9 on the securing element 5, as will be explained in more detail below. In addition, the toothed rack element 9 is equipped with a blocking element 10.

According to the invention, the blocking element 10 is designed as a tilting lever 10 that defines at least two end positions of the toothed rack element 9. The tilting lever 10 is connected to the toothed rack element 9 in an articulated manner. A transmission lever 11 is provided for this purpose. It can be seen that the tilting lever 10 is connected in an articulated manner to the toothed rack element 9 with the help of the transmission lever 11. For this purpose, the tilting lever 10 and the transmission lever 11 are mounted on the same axis. A spring 12 which is associated with the tilting lever 10 can also be seen. The spring 12 is a restoring spring. In addition, the spring 12 is designed as a torsion spring and encloses with its leg base a bearing pin that defines the common axis of the tilting lever 10 and the transmission lever 11. The two spring legs extending from the leg base are supported on respective stops of the tilting lever 10. In this way, a pivoting movement of the tilting lever 10 starting from its neutral position shown in FIG. 1 results in the spring or restoring spring 12 in question being tensioned. After the toothed rack element 9 is no longer acted upon with the help of the drive 6, 7, 8, the spring or restoring spring 12 ensures that the tilting lever 10, and with it the toothed rack element 9 and also the entire drive 6, 7, 8, are transferred back to their home position or the neutral position (shown in FIG. 1 or FIG. 2A).

The tilting lever is equipped with two blocking legs 10*a*, 10*b* in an overall C-shaped manner. The two blocking legs 10*a*, 10*b* can thereby interact with a stop 13 arranged therebetween. According to the exemplary embodiment, this stop 13 is designed as a rear stop disk or stop rib 13, which is connected to a worm wheel 8 as part of the drive 6, 7, 8 at the rear.

In fact, the drive 6, 7, 8 consists essentially of an electric motor 6, a drive worm 7 arranged on the output shaft of the electric motor 6 and the worm wheel 8 in question, which meshes with the drive worm 7. The worm wheel 8 in turn carries a gear wheel 8*a* which engages in the toothed rack element 9. In this way, rotational movements of the worm wheel 8 or gear wheel 8*a* are converted into linear adjustment movements of the toothed rack element 9.

The securing element 5 is in turn connected in an articulated manner to the toothed rack element 9, specifically at an end opposite a toothing of the toothed rack element 9. In addition, the securing element 5 is a securing lever 5 which is acted upon by a spring 14 to secure the position.

The mode of operation is as follows. Starting from the neutral position shown in FIGS. 1 and 2A, acting upon the drive 6, 7, 8 in such a way that the gear wheel 8*a* (in FIG. 1) is acted upon clockwise causes the toothed rack element 9 to move to the left. As a result of this, the tilting lever 10 also pivots clockwise (in the rear view according to FIG. 2*a*), so that its blocking leg 10*a* comes to rest against the stop disk 13 of the worm wheel 8. As a result, the “child-proof” position shown in FIG. 2B is set. After the drive 6, 7, 8 is no longer applying force to the toothed rack element 9, the restoring spring 12 ensures that the drive 6, 7, 8 and also the toothed rack element 9 are returned to their starting position or neutral position (cf. FIGS. 1 and 2A).

Actuation of the drive 6, 7, 8 starting from the initial position in such a way that the gear wheel 8*a* (in FIG. 1) rotates counterclockwise now causes the toothed rack element 9 in FIG. 1 to be moved to the right. The consequence of this is that the tilting lever 10 pivots clockwise (in FIG. 1 and counterclockwise in FIG. 2C) so that its other blocking leg 10*b* again comes into contact with the stop or the stop disk 13. The “theft-proof” functional position shown in FIG. 2C is now reached. This “theft-proof” function corresponds to a locking lever 15 connected to the toothed rack element 9 acting on an inner clutch lever 16 in the sense of “disengaging.” Typically, the inner clutch lever 16 is “engaged” most of the time. At the same time, in the “theft-proof” position, the securing element 5 keeps the outer clutch lever 3 in the “disengaged” position according to FIG. 2C. Consequently, the motor vehicle lock can be opened neither from the inside nor from the outside.

In contrast, the outer clutch lever 3 is engaged in the “child-proof” position according to FIG. 2*b*, so that in this functional position only the inner clutch lever 16 is disengaged, so that the motor vehicle lock in question cannot be opened from the inside. In contrast, the outer clutch lever 3 is “engaged” in this case, so that, when the motor vehicle lock is unlocked, the associated motor vehicle door can still be opened from the outside.

In contrast, the “theft-proof” position according to FIG. 2C corresponds to both clutch levers 3, 16 being in their “disengaged” position, so that the motor vehicle lock in question cannot be opened either from the inside or from the outside. This is the usual and desired anti-theft function.

Figure 2A:
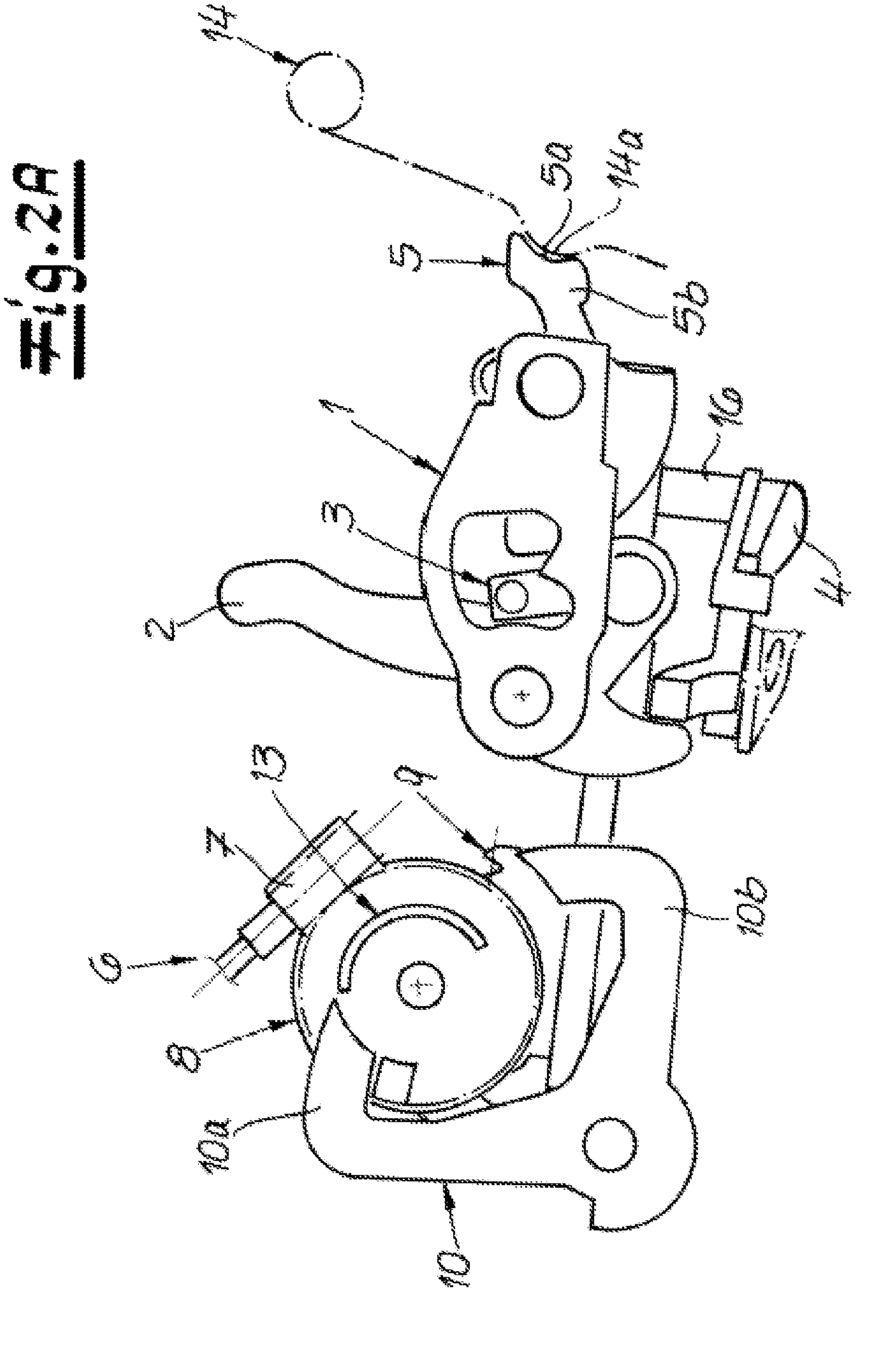
FIG. 2A shows a rear view of the motor vehicle lock according to FIG. 1 in the neutral position.
Figure 2B:
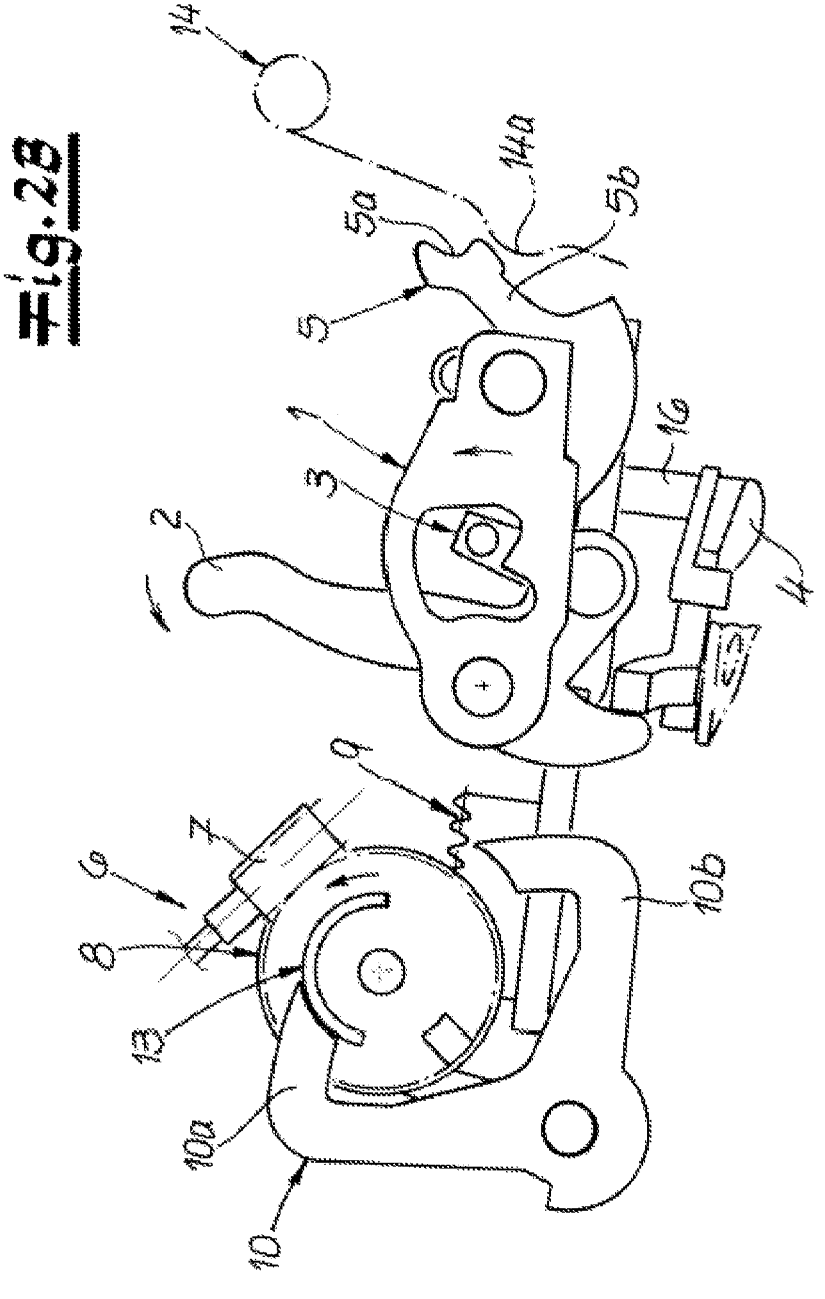
FIG. 2B shows the motor vehicle lock according to FIG. 2A in the “child-proof” position.
Figure 2C:
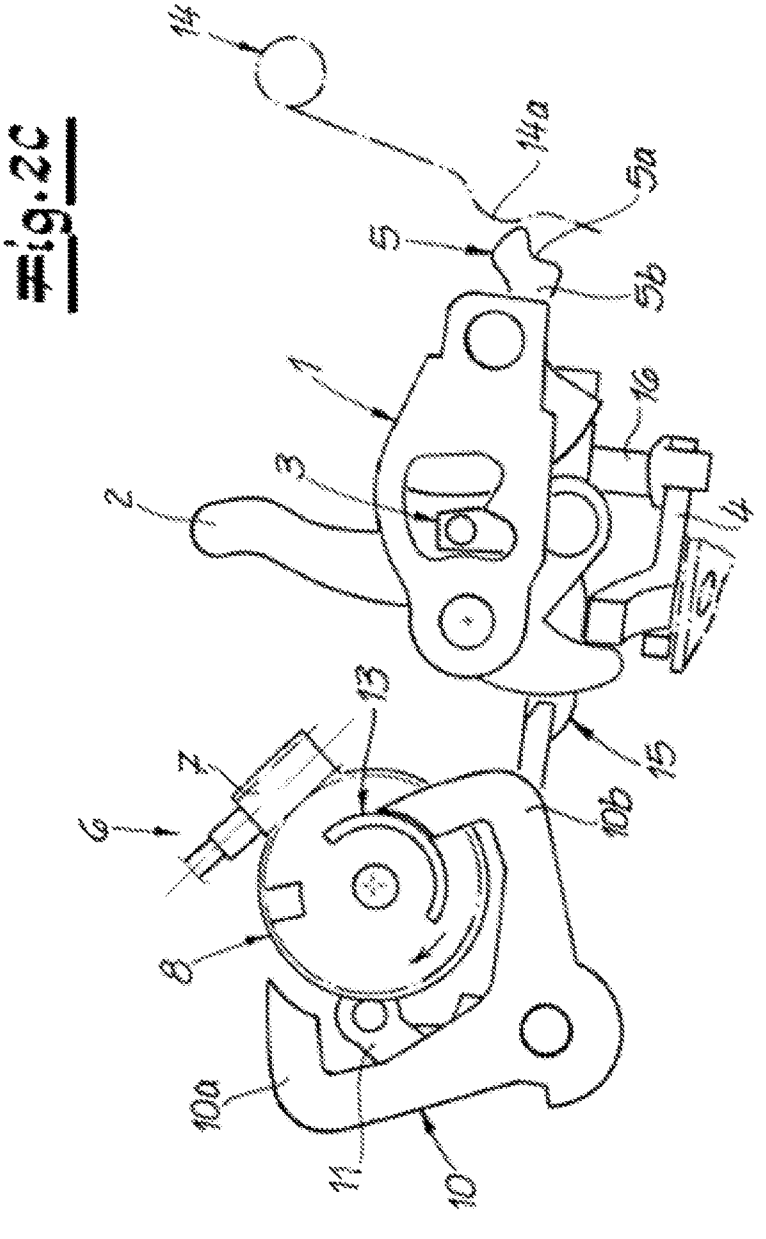
FIG. 2C shows the motor vehicle lock according to FIG. 2A in the “theft-proof” position.

In FIGS. 2A to 2C, the different positions of the securing element 5 relative to the spring 14 interacting with the securing element 5 are shown. The spring 14 has a lug 14*a* for this purpose. In addition, the securing element 5 is equipped with a bulge 5*a*. It can be seen that the three different functional positions discussed above, neutral or “unlocked or not locked,” “child-proof” and finally “theft-proof,” correspond to a spring cantilever 5*b* of the securing element 5 with the front bulge 5*a* being either centrally secured by the lug 14*a* or located on one side or the other of the lug 14*a*. In other words, the interaction between the spring 14 and the securing element 5 ensures that the securing element 5 is secured in position.

LIST OF REFERENCE SIGNS

1 Operating lever
2 Opening lever
3 Outer clutch lever
4 Release lever
5 Securing element
5*a* Bulge
6, 7, 8 Drive
6 Electric motor
7 Output worm
8 Worm wheel
8*a* Gear wheel
9 Toothed rack element
10 Tilting lever
10*a*, 10*b* Blocking leg
11 Transmission lever
12 Restoring spring
13 Stop disk
14 Spring
14*a* Lug
15 Locking lever
16 Inner clutch lever

The invention claimed is:

1. A motor vehicle lock comprising:
a locking mechanism having a rotary latch and a pawl,
a drive, a toothed rack element, and a securing element,
wherein the drive acts on the securing element via the toothed rack element, and
wherein the toothed rack element has a blocking element, wherein the blocking element is a tilting lever that defines two end positions of the toothed rack element, and
wherein the tilting lever has two blocking legs oriented in a C-shaped manner.

2. The motor vehicle lock according to claim 1, wherein the tilting lever is connected to the toothed rack element.

3. The motor vehicle lock according to claim 1, further comprising a transmission lever, wherein the tilting lever is connected in an articulated manner to the toothed rack element by the transmission lever.

4. The motor vehicle lock according to claim 1, wherein the two blocking legs interact with a stop arranged between the two blocking legs.

5. The motor vehicle lock according to claim 4, wherein the stop is a component part of the drive.

6. The motor vehicle lock according to claim 5, wherein the stop is formed on a worm wheel of the drive.

7. The motor vehicle lock according to claim 1, wherein the tilting lever has a restoring spring.

8. The motor vehicle lock according to claim 1, wherein the securing element is connected to the toothed rack element.

9. The motor vehicle lock according to claim 1, wherein the securing element acts as a securing lever that interacts with a torsion spring to secure a position of the securing element.

10. The motor vehicle lock according to claim 3, wherein the tilting lever and the transmission lever are mounted coaxially relative to one another.

11. The motor vehicle lock according to claim 7, wherein the restoring spring is a bistable spring that can act in opposite directions and restores to a middle position.

12. The motor vehicle lock according to claim 7, wherein the restoring spring is a torsion spring.

13. The motor vehicle lock according to claim 6, wherein the worm wheel has rear stop disk that has an outer circumference having two opposing stops for blocking the tilting lever corresponding to the two end positions of the toothed rack element.

14. The motor vehicle lock according to claim 6, wherein the worm wheel includes a gear wheel that interacts with the toothed rack element, wherein the gear wheel is rotated in a first direction to move the toothed rack element toward a first end position of the two end positions of the toothed rack element, and the gear wheel is rotated in a second direction opposite from the first direction to move the toothed rack element toward a second end position of the two end positions of the toothed rack element.

15. The motor vehicle lock according to claim 9, wherein the securing element has a spring cantilever that interacts with a lug on a leg of the torsion spring whereby the securing element is securable in three different positions.

16. A motor vehicle lock comprising:
a locking mechanism having a rotary latch and a pawl,
a drive, a toothed rack element, and a securing element,
wherein the drive acts on the securing element via the toothed rack element,
wherein the toothed rack element has a blocking element, wherein the blocking element is a tilting lever that defines two end positions of the toothed rack element, and
wherein the tilting lever has a restoring spring.

17. A motor vehicle lock comprising:
a locking mechanism having a rotary latch and a pawl,
a drive, a toothed rack element, and a securing element,
wherein the drive acts on the securing element via the toothed rack element,
wherein the toothed rack element has a blocking element, wherein the blocking element is a tilting lever that defines two end positions of the toothed rack element,
wherein the securing element acts as a securing lever that interacts with a torsion spring to secure a position of the securing element, and
wherein the securing element has a spring cantilever that interacts with a lug on a leg of the torsion spring whereby the securing element is securable in three different positions.

* * * * *